(12) United States Patent
Roziere

(10) Patent No.: US 11,836,308 B2
(45) Date of Patent: *Dec. 5, 2023

(54) METHOD AND DEVICE FOR NAVIGATING IN A USER INTERFACE AND APPARATUS COMPRISING SUCH NAVIGATION

(71) Applicant: QuickStep Technologies LLC, Wilmington, DE (US)

(72) Inventor: Didier Roziere, Nimes (FR)

(73) Assignee: QuickStep Technologies LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,106

(22) Filed: Jan. 9, 2023

(65) Prior Publication Data

US 2023/0236684 A1 Jul. 27, 2023

Related U.S. Application Data

(63) Continuation of application No. 16/222,838, filed on Dec. 17, 2018, now Pat. No. 11,550,411, which is a
(Continued)

(30) Foreign Application Priority Data

Feb. 14, 2013 (FR) ...................... 1351275

(51) Int. Cl.
*G06F 3/0488* (2022.01)
*G06F 3/041* (2006.01)
(Continued)

(52) U.S. Cl.
CPC .............. *G06F 3/041* (2013.01); *G06F 3/042* (2013.01); *G06F 3/044* (2013.01); *G06F 3/0416* (2013.01);
(Continued)

(58) Field of Classification Search
CPC ..................... G06F 3/041; G06F 3/044; G06F 2203/04101; G06F 3/0488; G06F 3/0485;
(Continued)

(56) References Cited

U.S. PATENT DOCUMENTS

| | | |
|---|---|---|
| 5,103,085 A | 4/1992 | Zimmerman |
| 5,270,818 A | 12/1993 | Ottenstein |

(Continued)

FOREIGN PATENT DOCUMENTS

| | | |
|---|---|---|
| CA | 1243096 A | 10/1988 |
| CN | 201266371 Y | 7/2009 |

(Continued)

OTHER PUBLICATIONS

4-Wire Resistive Touchscreens, Available online at: <http://www.touchscreens.com/intro-touchtypes-4resistive.html>, Accessed on Aug. 5, 2005.
(Continued)

*Primary Examiner* — Dennis P Joseph
(74) *Attorney, Agent, or Firm* — Kubota & Basol LLP

(57) ABSTRACT

A method is provided for navigating in a display screen by way of a control surface including a step of measuring: —a data item, termed position, relating to a position targeted, on the control surface, by a remote control object positioned opposite the control surface, and —a data item, termed vertical distance, relating to the distance between the at least one remote control object and the control surface; and a drive step, carrying out, as a function of the vertical distance measured: —a displacement, and/or —an adjustment of a parameter relating to a displacement; of at least one part of a zone and/or of a symbol displayed on the display screen and chosen as a function of the target position.

30 Claims, 4 Drawing Sheets

Related U.S. Application Data continuation of application No. 14/767,238, filed as application No. PCT/EP2014/052533 on Feb. 10, 2014, now Pat. No. 10,156,941.

(51) Int. Cl.
  *G06F 3/042* (2006.01)
  *G06F 3/04883* (2022.01)
  *G06F 3/044* (2006.01)
  *G06F 3/0485* (2022.01)

(52) U.S. Cl.
  CPC .......... *G06F 3/0485* (2013.01); *G06F 3/0488* (2013.01); *G06F 3/04883* (2013.01); *G06F 2203/04101* (2013.01); *G06F 2203/04108* (2013.01); *G06F 2203/04806* (2013.01)

(58) Field of Classification Search
  CPC .............. G06F 3/04842; G06F 3/04806; G06F 2203/04108
  See application file for complete search history.

(56) References Cited

U.S. PATENT DOCUMENTS

| | | | |
|---|---|---|---|
| 5,345,550 | A | 9/1994 | Bloomfield |
| 5,347,295 | A | 9/1994 | Agulnick et al. |
| 5,363,051 | A | 11/1994 | Jenstrom et al. |
| 5,406,305 | A | 4/1995 | Shimomura et al. |
| 5,483,261 | A | 1/1996 | Yasutake |
| 5,488,204 | A | 1/1996 | Mead et al. |
| 5,528,266 | A | 6/1996 | Arbeitman et al. |
| 5,684,294 | A | 11/1997 | Kouhi |
| 5,825,352 | A | 10/1998 | Bisset et al. |
| 5,835,079 | A | 11/1998 | Shieh |
| 5,844,506 | A | 12/1998 | Binstead |
| 5,880,411 | A | 3/1999 | Gillespie et al. |
| 5,952,992 | A | 9/1999 | Helms |
| 5,956,291 | A | 9/1999 | Nehemiah et al. |
| 6,073,036 | A | 6/2000 | Heikkinen et al. |
| 6,105,419 | A | 8/2000 | Michels et al. |
| 6,188,391 | B1 | 2/2001 | Seely et al. |
| 6,253,218 | B1 | 6/2001 | Aoki et al. |
| 6,308,144 | B1 | 10/2001 | Bronfeld et al. |
| 6,310,610 | B1 | 10/2001 | Beaton et al. |
| 6,313,853 | B1 | 11/2001 | Lamontagne et al. |
| 6,323,846 | B1 | 11/2001 | Westerman et al. |
| 6,373,612 | B1 | 4/2002 | Hoffman et al. |
| 6,414,674 | B1 | 7/2002 | Kamper et al. |
| 6,480,188 | B1 | 11/2002 | Horsley |
| 6,520,013 | B1 | 2/2003 | Wehrenberg |
| 6,583,676 | B2 | 6/2003 | Krah et al. |
| 6,601,012 | B1 | 7/2003 | Horvitz et al. |
| 6,661,920 | B1 | 12/2003 | Skinner |
| 6,664,744 | B2 | 12/2003 | Dietz |
| 6,680,677 | B1 | 1/2004 | Tiphane |
| 6,690,275 | B2 | 2/2004 | Long et al. |
| 6,690,387 | B2 | 2/2004 | Zimmerman et al. |
| 6,812,466 | B2 | 11/2004 | Oconnor et al. |
| 6,822,635 | B2 | 11/2004 | Shahoian et al. |
| 6,847,354 | B2 | 1/2005 | Vranish |
| 6,903,730 | B2 | 6/2005 | Mathews et al. |
| 6,920,619 | B1 | 7/2005 | Milekic |
| 6,938,221 | B2 | 8/2005 | Nguyen |
| 6,947,571 | B1 | 9/2005 | Rhoads et al. |
| 6,956,564 | B1 | 10/2005 | Williams |
| 6,961,912 | B2 | 11/2005 | Aoki et al. |
| 7,015,894 | B2 | 3/2006 | Morohoshi |
| 7,016,705 | B2 | 3/2006 | Bahl et al. |
| 7,019,622 | B2 | 3/2006 | Orr et al. |
| 7,058,902 | B2 | 6/2006 | Iwema et al. |
| 7,151,528 | B2 | 12/2006 | Taylor et al. |
| 7,171,221 | B1 | 1/2007 | Amin et al. |
| 7,184,064 | B2 | 2/2007 | Zimmerman et al. |
| 7,319,454 | B2 | 1/2008 | Thacker et al. |
| 7,417,650 | B1 | 8/2008 | Horvitz |
| 7,522,065 | B2 | 4/2009 | Falcon |
| RE40,867 | E | 8/2009 | Binstead |
| 7,570,064 | B2 | 8/2009 | Roziere |
| 7,593,552 | B2 | 9/2009 | Higaki et al. |
| 7,633,076 | B2 | 12/2009 | Huppi et al. |
| 7,653,883 | B2 | 1/2010 | Hotelling et al. |
| 7,663,607 | B2 | 2/2010 | Hotelling et al. |
| 7,663,620 | B2 | 2/2010 | Robertson et al. |
| 7,715,790 | B1 | 5/2010 | Kennedy |
| 7,743,348 | B2 | 6/2010 | Robbins et al. |
| 8,149,002 | B2 | 4/2012 | Ossart et al. |
| 8,159,213 | B2 | 4/2012 | Roziere |
| 8,381,135 | B2 | 2/2013 | Hotelling et al. |
| 8,479,122 | B2 | 7/2013 | Hotelling et al. |
| 8,612,856 | B2 | 12/2013 | Hotelling et al. |
| 8,770,033 | B2 | 7/2014 | Roziere |
| 8,917,256 | B2 | 12/2014 | Roziere |
| 8,935,625 | B2 | 1/2015 | Alonso Lago |
| 9,035,903 | B2 | 5/2015 | Binstead |
| 10,042,418 | B2 | 8/2018 | Hotelling et al. |
| 10,067,632 | B2 | 9/2018 | Shinde et al. |
| 10,303,266 | B2 | 5/2019 | Roziere |
| 2001/0015718 | A1 | 8/2001 | Hinckley et al. |
| 2001/0031633 | A1 | 10/2001 | Tuomela et al. |
| 2001/0035858 | A1 | 11/2001 | Blumberg |
| 2002/0036618 | A1 | 3/2002 | Wakai et al. |
| 2002/0057260 | A1 | 5/2002 | Mathews et al. |
| 2002/0140633 | A1 | 10/2002 | Rafii et al. |
| 2002/0167488 | A1 | 11/2002 | Hinckley et al. |
| 2003/0001899 | A1 | 1/2003 | Partanen et al. |
| 2003/0016253 | A1 | 1/2003 | Aoki et al. |
| 2003/0076363 | A1 | 4/2003 | Murphy |
| 2003/0095096 | A1 | 5/2003 | Robbin et al. |
| 2003/0132922 | A1 | 7/2003 | Philipp |
| 2003/0160808 | A1 | 8/2003 | Foote et al. |
| 2003/0179201 | A1 | 9/2003 | Thacker |
| 2004/0021647 | A1 | 2/2004 | Iwema et al. |
| 2004/0095318 | A1 | 5/2004 | Morrison et al. |
| 2004/0135818 | A1 | 7/2004 | Thomson et al. |
| 2004/0145601 | A1 | 7/2004 | Brielmann et al. |
| 2004/0150668 | A1 | 8/2004 | Myers et al. |
| 2004/0150669 | A1 | 8/2004 | Sabiers et al. |
| 2004/0224638 | A1 | 11/2004 | Fadell et al. |
| 2004/0233153 | A1 | 11/2004 | Robinson |
| 2004/0245438 | A1 | 12/2004 | Payne et al. |
| 2005/0015731 | A1 | 1/2005 | Mak et al. |
| 2005/0057524 | A1 | 3/2005 | Hill et al. |
| 2005/0134578 | A1 | 6/2005 | Chambers et al. |
| 2005/0190142 | A1 | 9/2005 | Ferguson |
| 2005/0219223 | A1 | 10/2005 | Kotzin et al. |
| 2005/0219228 | A1 | 10/2005 | Alameh et al. |
| 2005/0219394 | A1 | 10/2005 | Du et al. |
| 2005/0221791 | A1 | 10/2005 | Angelhag |
| 2005/0223308 | A1 | 10/2005 | Gunn et al. |
| 2006/0001650 | A1 | 1/2006 | Robbins et al. |
| 2006/0010400 | A1 | 1/2006 | Dehlin et al. |
| 2006/0012577 | A1 | 1/2006 | Kyrola |
| 2006/0017692 | A1 | 1/2006 | Wehrenberg et al. |
| 2006/0026521 | A1 | 2/2006 | Hotelling et al. |
| 2006/0026535 | A1 | 2/2006 | Hotelling et al. |
| 2006/0097733 | A1 | 5/2006 | Roziere |
| 2006/0117108 | A1 | 6/2006 | Salisbury et al. |
| 2006/0146012 | A1 | 7/2006 | Arneson et al. |
| 2006/0161846 | A1 | 7/2006 | Van |
| 2006/0161870 | A1 | 7/2006 | Hotelling et al. |
| 2006/0161871 | A1 | 7/2006 | Hotelling et al. |
| 2006/0164241 | A1 | 7/2006 | Makela et al. |
| 2006/0197753 | A1 | 9/2006 | Hotelling |
| 2006/0244735 | A1 | 11/2006 | Wilson |
| 2006/0279548 | A1 | 12/2006 | Geaghan |
| 2006/0290921 | A1 | 12/2006 | Hotelling et al. |
| 2007/0075965 | A1 | 4/2007 | Huppi et al. |
| 2007/0085157 | A1 | 4/2007 | Fadell et al. |
| 2007/0099574 | A1 | 5/2007 | Wang |
| 2007/0216659 | A1 | 9/2007 | Amineh |
| 2007/0277123 | A1 | 11/2007 | Shin et al. |
| 2007/0288860 | A1 | 12/2007 | Ording et al. |
| 2007/0294639 | A1 | 12/2007 | Van et al. |

(56) References Cited

U.S. PATENT DOCUMENTS

| | | |
|---|---|---|
| 2008/0006762 A1 | 1/2008 | Fadell et al. |
| 2008/0090617 A1 | 4/2008 | Sutardja |
| 2008/0113618 A1 | 5/2008 | De et al. |
| 2008/0165141 A1 | 7/2008 | Christie |
| 2008/0211779 A1 | 9/2008 | Pryor |
| 2008/0278450 A1 | 11/2008 | Lashina |
| 2008/0284261 A1 | 11/2008 | Andrieux et al. |
| 2008/0307345 A1 | 12/2008 | Hart et al. |
| 2008/0307360 A1 | 12/2008 | Chaudhri et al. |
| 2008/0309632 A1 | 12/2008 | Westerman et al. |
| 2009/0058829 A1 | 3/2009 | Kim et al. |
| 2009/0128498 A1 | 5/2009 | Hollemans et al. |
| 2009/0237371 A1 | 9/2009 | Kim et al. |
| 2009/0247233 A1 | 10/2009 | Kim |
| 2009/0265670 A1 | 10/2009 | Kim et al. |
| 2009/0289914 A1 | 11/2009 | Cho |
| 2009/0295715 A1 | 12/2009 | Seo et al. |
| 2009/0315858 A1 | 12/2009 | Sato et al. |
| 2009/0327969 A1 | 12/2009 | Estrada |
| 2010/0052700 A1 | 3/2010 | Yano et al. |
| 2010/0060599 A1 | 3/2010 | Kwak et al. |
| 2010/0095206 A1 | 4/2010 | Kim |
| 2010/0123667 A1 | 5/2010 | Kim et al. |
| 2010/0211919 A1 | 8/2010 | Brown et al. |
| 2010/0265204 A1 | 10/2010 | Tsuda |
| 2010/0283743 A1 | 11/2010 | Coddington |
| 2010/0289740 A1 | 11/2010 | Kim et al. |
| 2011/0018811 A1 | 1/2011 | Miernik |
| 2011/0041096 A1 | 2/2011 | Larco et al. |
| 2011/0057956 A1 | 3/2011 | Ranford |
| 2011/0128244 A1 | 6/2011 | Cho et al. |
| 2011/0164063 A1 | 7/2011 | Shimotani et al. |
| 2011/0169783 A1 | 7/2011 | Wang et al. |
| 2011/0179368 A1 | 7/2011 | King et al. |
| 2011/0221693 A1 | 9/2011 | Miyazaki |
| 2011/0221776 A1 | 9/2011 | Shimotani et al. |
| 2011/0248963 A1 | 10/2011 | Lawrence et al. |
| 2011/0296351 A1 | 12/2011 | Ewing et al. |
| 2012/0026113 A1 | 2/2012 | Kasahara et al. |
| 2012/0044662 A1 | 2/2012 | Kim et al. |
| 2012/0187965 A1 | 7/2012 | Roziere |
| 2012/0188200 A1 | 7/2012 | Roziere |
| 2012/0249443 A1 | 10/2012 | Anderson et al. |
| 2012/0270533 A1 | 10/2012 | You |
| 2013/0135247 A1 | 5/2013 | Na et al. |
| 2013/0154982 A1 | 6/2013 | Hotelling et al. |
| 2013/0225242 A1* | 8/2013 | Hwang ............... G06F 3/04817 455/566 |
| 2013/0307776 A1 | 11/2013 | Roziere |
| 2014/0062875 A1 | 3/2014 | Rafey et al. |
| 2014/0074426 A1 | 3/2014 | Hotelling et al. |
| 2014/0132335 A1 | 5/2014 | Rauhala et al. |
| 2015/0035792 A1 | 2/2015 | Roziere et al. |
| 2016/0004348 A1 | 1/2016 | Roziere |
| 2016/0179247 A1 | 6/2016 | Blondin |
| 2018/0341324 A1 | 11/2018 | Hotelling et al. |
| 2019/0121470 A1 | 4/2019 | Roziere |
| 2019/0361539 A1 | 11/2019 | Roziere |

FOREIGN PATENT DOCUMENTS

| | | |
|---|---|---|
| CN | 101526881 A | 9/2009 |
| CN | 101547253 A | 9/2009 |
| CN | 101681218 A | 3/2010 |
| CN | 101727236 A | 6/2010 |
| CN | 101952792 A | 1/2011 |
| CN | 102037436 A | 4/2011 |
| DE | 10042300 A1 | 3/2002 |
| DE | 10059906 A1 | 6/2002 |
| DE | 10251296 A1 | 5/2004 |
| EP | 0462759 A2 | 12/1991 |
| EP | 0464908 A2 | 1/1992 |
| EP | 0288692 B1 | 7/1993 |
| EP | 0664504 A2 | 7/1995 |
| EP | 0992969 A1 | 4/2000 |
| EP | 1014295 A3 | 1/2002 |
| EP | 1185058 A2 | 3/2002 |
| EP | 1335430 A1 | 8/2003 |
| EP | 1355223 A2 | 10/2003 |
| EP | 1452988 A1 | 9/2004 |
| EP | 1507132 A1 | 2/2005 |
| EP | 1507196 A2 | 2/2005 |
| EP | 1569079 A1 | 8/2005 |
| EP | 1696414 A1 | 8/2006 |
| EP | 2104024 A1 | 9/2009 |
| EP | 2105844 A2 | 9/2009 |
| EP | 2109030 A2 | 10/2009 |
| EP | 2166463 A1 | 3/2010 |
| EP | 2267791 A2 | 12/2010 |
| EP | 2426581 A2 | 3/2012 |
| EP | 2634680 A1 | 9/2013 |
| EP | 2634687 A2 | 9/2013 |
| EP | 2778859 A1 | 9/2014 |
| FR | 2756048 A1 | 5/1998 |
| FR | 2844349 A1 | 3/2004 |
| GB | 2330670 A | 4/1999 |
| GB | 2418808 A | 4/2006 |
| JP | S63167923 A | 7/1988 |
| JP | H06161661 A | 6/1994 |
| JP | H08263699 A | 10/1996 |
| JP | 2000163031 A | 6/2000 |
| JP | 2002342033 A | 11/2002 |
| KR | 20110029681 A | 3/2011 |
| WO | 9718547 A1 | 5/1997 |
| WO | 9723738 A1 | 7/1997 |
| WO | 9814863 A2 | 4/1998 |
| WO | 9928813 A1 | 6/1999 |
| WO | 0038042 A1 | 6/2000 |
| WO | 2004093045 A1 | 10/2004 |
| WO | 2006003590 A2 | 1/2006 |
| WO | 2006023569 A1 | 3/2006 |
| WO | 2006026012 A2 | 3/2006 |
| WO | 2006003590 A3 | 5/2006 |
| WO | 2009028892 A2 | 3/2009 |
| WO | 2015007781 A1 | 1/2015 |

OTHER PUBLICATIONS

5-Wire Resistive Touchscreens, Available online at: <http://www.touchscreens.com/intro-touchtypes-resistive.html>, Accessed on Aug. 5, 2005.

A Brief Overview of Gesture Recognition, Available online at: <http://www.dai.ed.ac.uk/Cvonline/LOCA_COPIES/COHEN/gesture_overview.html>, Accessed on Apr. 20, 2004.

Advisory Action received for U.S. Appl. No. 13/982,791, dated Oct. 17, 2018, 2 pages.

Ai Squared Products—XoomText Magnifier, Available Online at: <http://www/aisquared.com/Products/zoomtexturemag/index.cfm>, Accessed on Oct. 26, 2005.

Applicant Initiated Interview Summary received for U.S. Appl. No. 16/398,321, dated Jan. 12, 2021, 3 pages.

Capacitive Position Sensing, Available online at: <http://www.synaptics.com/technology/cps.cfm>, Accessed on Aug. 5, 2005.

Capacitive Touchscreens, Available online at: <http://www.touchscreens.com/intro-touchtypes-capacitive.html>, Accessed on Aug. 5, 2005.

Comparing Touch Technologies, Available online at: <http://www.touchscreens.com/intro-touchtypes.html>, Accessed on Oct. 10, 2004.

Final Office Action received for U.S. Appl. No. 13/982,791, dated Jan. 20, 2017, 14 pages.

Final Office Action received for U.S. Appl. No. 13/982,791, dated Jun. 7, 2018, 6 pages.

Final Office Action received for U.S. Appl. No. 13/982,791, dated Oct. 15, 2015, 17 pages.

Final Office Action received for U.S. Appl. No. 14/767,238, dated Mar. 9, 2018, 23 pages.

Final Office Action received for U.S. Appl. No. 16/222,838, dated Jan. 28, 2020, 37 pages.

Final Office Action received for U.S. Appl. No. 16/222,838, dated Jul. 12, 2021, 45 pages.

(56) References Cited

OTHER PUBLICATIONS

Final Office Action received for U.S. Appl. No. 16/398,321, dated Feb. 25, 2021, 21 pages.
Final Office Action received for U.S. Appl. No. 14/767,238, dated Mar. 17, 2017, 16 pages.
Final Office Action received for U.S. Appl. No. 16/398,321, dated Sep. 1, 2020, 19 pages.
FingerWorks—Gesture Guide—Application Switching, Available online at: <http://www.fingerworks.com/gesture_guide_apps.html>, Accessed on Aug. 27, 2004, 1 page.
FingerWorks—Gesture Guide—Editing, Available online at: <http://www.fingerworks.com/gesure_guide_editing.html> Feb. 13, 2004, Accessed on Aug. 27, 2004, 1 page.
FingerWorks—Gesture Guide—File Operations, Available online at: <http://www.fingetworks.com/gesture_guide_files.html> Jun. 18, 2004, Accessed on Aug. 27, 2004, 1 page.
FingerWorks—Gesture Guide—Text Manipulation, Available online at: <http://www.fingerworks.com/gesture_guide_text_maninp.html> Jun. 6, 2004, Accessed on Aug. 27, 2004, 2 pages.
FingerWorks—Gesture Guide—Tips and Tricks, Available online at: <http://www.fingerworks.com/gesture_guide_tips.html>, Accessed on Aug. 27, 2004, 1 page.
FingerWorks—Gesture Guide—Web, Available online at: <http://www.fingerworks.com/gesture_guide_web.html> Jun. 5, 2004, Accessed on Aug. 27, 2004, 1 page.
FingerWorks—Guide to Hand Gestures for USB Touchpads, Available online at: <http://www.fingetworks.com/igesture_userguide.html>, Accessed on Aug. 27, 2004, 1 page.
FingerWorks—iGesture—Technical Details, Available online at: <http://www.fingetworks.com/igesture_tech.html>, Accessed on Aug. 27, 2004, 1 page.
FingerWorks—The Only Touchpads with Ergonomic Full-Hand Resting and Relaxation!, Available online at: <http://www.fingerworks.com/resting.html>, 2001, 1 page.
FingerWorks—Tips for Typing on the Mini, Available online at: <http://www.fingerworks.com/mini_typing.html> Jun. 5, 2004, Accessed on Aug. 27, 2004, 2 pages.
Gesture Recognition, Available online at: <http://www.fingetworks.com/gesture_recognition.html>, downloaded on Aug. 30, 2005, 2 pages.
GlidePoint, Available online at: <http://www.cirque.com/technology/technology_gp.html>, Accessed on Aug. 5, 2005.
How Do Touchscreen Monitors Know Where You're Touching?, Available online at: <http://electronics.howstuffworks.com/question716.html>, Jul. 7, 2008, 2 pages.
How Does a Touchscreen Work?, Available online at: <http://www.touchscreens.com/intro-anatomy.html>, Accessed on Aug. 5, 2005.
IGesture Pad—the MultiFinger USB TouchPad with Whole-Hand Gestures, Available online at: <http://www.fingerworks.com/igesture.html>, Accessed on Aug. 27, 2004, 2 pages.
IGesture Products for Everyone (learn in minutes) Product Overview, Available online at: <FingerWorks.com>, Accessed on Aug. 30, 2005.
Infrared Touchscreens, Available online at: < http://www.touchscreens.com/intro-touchtypes-infrared.html>, Accessed on Aug. 5, 2005.
International Search Report received for PCT Patent Application No. PCT/EP2014/052533, dated May 9, 2014, 3 pages.
International Search Report received for PCT Patent Application No. PCT/EP2015/052876, dated Jun. 16, 2015, 6 pages.
International Search Report received for PCT Patent Application No. PCT/FR2012/050183, dated Apr. 16, 2012, 3 pages.
Lunar Screen Magnifier and Lunar Plus Enhanced Screen Magnifier, Available Online at: <www.dolphincomputeraccess.com/products/lunar.htm>, accessed on Oct. 25, 2005.
Mouse Emulation, FingerWorks, Available online at: <http://www.fingerworks.com/gesture_guide_mouse.html> Dec. 10, 2002, Accessed on Aug. 30, 2005.
Mouse Gestures, Optim oz, May 21, 2004.
Mouse Gestures in Opera, Available online at: <http://www.opera.com/products/desktop/mouse/index.dml>, Accessed on Aug. 30, 2005.
MultiTouch Overview, FingerWorks, Available online at: <http://www.fingerworks.com/multoverview.html>, Accessed on Aug. 30, 2005.
Near Field Imaging Touchscreens, Available online at: <http://www.touchscreens.com/intro-touchtypes-nfi.html>, Accessed on Aug. 5, 2005.
Non-Final Office Action received for U.S. Appl. No. 13/982,791, dated Mar. 25, 2015, 18 pages.
Non-Final Office Action received for U.S. Appl. No. 13/982,791, dated Apr. 22, 2016, 16 pages.
Non-Final Office Action received for U.S. Appl. No. 13/982,791, dated Oct. 6, 2017, 16 pages.
Non-Final Office Action received for U.S. Appl. No. 14/767,238, dated Sep. 15, 2017, 16 pages.
Non-Final Office Action received for U.S. Appl. No. 14/767,238, dated Sep. 28, 2016, 12 pages.
Non-Final Office Action received for U.S. Appl. No. 16/222,838, dated Aug. 15, 2019, 25 pages.
Non-Final Office Action received for U.S. Appl. No. 16/222,838, dated Jan. 26, 2021, 38 pages.
Non-Final Office Action received for U.S. Appl. No. 16/398,321, dated Apr. 2, 2020, 18 pages.
Non-Final Office Action received for U.S. Appl. No. 16/398,321, dated Jun. 14, 2021, 20 pages.
Notice of Allowance received for U.S. Appl. No. 13/982,791, dated Jan. 11, 2019, 21 pages.
Notice of Allowance received for U.S. Appl. No. 14/767,238, dated Aug. 8, 2018, 8 pages.
Notice of Allowance received for U.S. Appl. No. 16/222,838, dated Aug. 30, 2022, 9 Pages.
Notice of Allowance received for U.S. Appl. No. 16/222,838, dated May 18, 2022, 8 Pages.
Notice of Allowance received for U.S. Appl. No. 16/398,321, dated Jul. 13, 2021, 8 pages.
PenTouch Capacitive Touchscreens, Available online at: <http://www.touchscreens.com/intro-touchtypes-pentouch.html>, Accessed on Aug. 5, 2005.
Search Report received for Chinese Patent Application No. 201280007164.6, dated Apr. 20, 2017, 4 pages.
Search Report received for Chinese Patent Application No. 201810965827.4, dated Dec. 31, 2020, 5 pages (2 page of English Translation and 3 page of Official Copy).
Search Report received for French Patent Application No. 1150726, dated Sep. 2, 2011, 2 pages.
Search Report received for French Patent Application No. 1351275, dated Oct. 18, 2013, 2 pages.
Search Report received for French Patent Application No. 1451080, dated Jul. 22, 2014, 2 pages.
Surface Acoustic Wave Touchscreens, Available online at: <http://www.touchscreens.com/intro-touchtypes-saw.html>, Accessed on Aug. 5, 2005.
Symbol Commander, Available online at: <http://www.sensiva.com/symbolcomander/>, Accessed on Aug. 30, 2005.
Touch Technologies: Touch is Everywhere, Available online at: <http://www.3m.com/3MTouchSystems/downloads/PDFs/TouchTechOV.pdf>, Accessed on Aug. 30, 2005.
Touchscreen Technology Choices, Available online at: <http://www.elotouch.com/products/detech2.asp>, Accessed on Aug. 5, 2005.
Visual Disabilities, Available Online at: <http://depts.stcc.edu/ods/ACCESS/bpvisual.htm>, Accessed on Oct. 25, 2005.
Wacom Components—Technology, Available online at: <http://www.wacom-components.com/english/tech.asp>, Accessed on Oct. 10, 2004.
Watershed Algorithm, Available online at: <http://rsb.info.nih.gov/ij/plugins/watershed.html>, Accessed on Aug. 5, 2005.
Agilent Technologies Inc.,"Agilent unveils optical proximity sensor for mobile appliances", Available online at: <http:/www.embeddedstar.com/press/content/2004/8/embedded16015.html>, Accessed on Aug. 31, 2004, 2 pages.

(56) References Cited

OTHER PUBLICATIONS

Ahmad Subatai, "A Usable Real-Time 3D Hand Tracker", Proceedings of the 28th Asilomar Conference on Signals, Systems and Computers—Part 2 (of 2), vol. 2, Oct. 1994, 5 pages.
Bier et al., "Toolglass and Magic Lenses: The See-Through Interface", In James Kijiya, editor, Computer Graphics (SIGGRAPH '93 Proceedings), vol. 27, Aug. 1993, pp. 73-80.
Chen et al., "Flowfield and Beyond: Applying Pressure-Sensitive Multi-Point Touchpad Interaction", Multimedia and Expo, ICME '03, Proceedings, Jul. 9, 2003, pp. I-49-I52.
cnet news.com,"Reinventing the Scroll Wheel", Photo 1, Available online at: <http://news.com.com/2300-1041_3-6107951-1.html?tag=ne.gall.pg>, Accessed on Aug. 22, 2006, 2 pages.
cnet news.com,"Reinventing the Scroll Wheel", Photo 2, Available online at: <http://news.com.com/2300-1041_3-6107951-2.html?tag=ne.gall.pg>, Accessed on Aug. 22, 2006, 2 pages.
cnet news.com,"Reinventing the Scroll Wheel", Photo 3, Available online at: <http://news.com.com/2300-1041_3-6107951-3.html?tag=ne.gall.pg>, Accessed on Aug. 22, 2006, 2 pages.
cnet news.com,"Reinventing the Scroll Wheel", Photo 4, Available online at: <http://news.com.com/2300-1041_3-6107951-4.html?tag=ne.gall.pg>, Accessed on Aug. 22, 2006, 2 pages.
cnet news.com,"Reinventing the Scroll Wheel", Photo 5, Available online at: <http://news.com.com/2300-1041_3-6107951-5.html?tag=ne.gall.pg>, Accessed on Aug. 22, 2006, 2 pages.
cnet news.com,"Reinventing the Scroll Wheel", Photo 6, Available online at: <http://news.com.com/2300-1041_3-6107951-6.html?tag=ne.gall.pg>, Accessed on Aug. 22, 2006, 2 pages.
cnet news.com,"Reinventing the Scroll Wheel", Photo 7, Available online at: <http://news.com.com/2300-1041_3-6107951-7.html?tag=ne.gall.pg>, Accessed on Aug. 22, 2006, 2 pages.
cnet news.com,"Reinventing the Scroll Wheel", Photo 8, Available online at: <http://news.com.com/2300-1041_3-6107951-8.html?tag=ne.gall.pg>, Accessed on Aug. 22, 2006, 2 pages.
Douglas et al., "The Ergonomics of Computer Pointing Devices", 1997.
EVB Elektronik,"TSOP6238 IR Receiver Modules for Infrared Remote Conrol Systems", Jan. 2004, 1 page.
Fisher et al., "Repetitive Motion Disorders: The Design of Optimal Rate-Rest Profiles", Human Factors, vol. 35, No. 2, Jun. 1993, pp. 283-304.
Fukumoto et al., "ActiveClick: Tactile Feedback for Touch Panels", In CHI 2001 Summary, 2001, pp. 121-122.
Fukumoto et al., "Body Coupled Fingering: Wireless Wearable Keyboard", CHI 97, March 1997, pp. 147-154.
Hardy Ian, "Fingerworks", BBC World On Line, Mar. 7, 2002.
Hillier et al., "Introduction to Operations Research", 1986.
Jacob et al., "Integrality and Separability of Input Devices", ACM Transactions on Computer-Human Interaction, vol. 1, Mar. 1994, pp. 3-26.
Kahney Leander, "Pocket PCs Masquerade as IPods", Available online at: <http://www.wired.com/gadgets/mac/news/2004/03/62543>, Mar. 8, 2004, 2 pages.
Kennedy et al., "Unpublished U.S. Appl. No. 10/805,144, filed Mar. 19, 2004, titled "Methods and Apparatuses for Configuration Automation"", 59 pages.
Kinkley et al., "Touch-Sensing Input Devices", CHI '99 Proceedings, May 1999, pp. 223-230.
Kionx,"KXP84 Series Summary Data Sheet", Oct. 21, 2005, 4 pages.
Lee et al., "A Multi-Touch Three Dimensional Touch-Sensitive Tablet", CHI'85 Proceedings, Apr. 1985, pp. 21-25.
Lee S., "A Fast Multiple-Touch-Sensitive Input Device", A Thesis Submitted in Conformity with the Requirements for the Degree of Master of Applied Science in the Department of Electrical Engineering, University of Toronto, Oct. 1984, 115 pages.
Matsushita et al., "HoloWall: Designing a Finger, Hand, Body and Object Sensitive Wall", In Proceedings of UIST '97, Oct. 1997.
Quantum Research Group,"QT510/QWheel Touch Slider IC", 2004-2005, 14 pages.
Quek,"Unencumbered Gestural Interaction", IEEE Multimedia, vol. 3, 1996, pp. 36-47.
Radwin,"Activation Force and Travel Effects on Overecertion in Repetitive Key Tapping", Human Factors, vol. 39, No. 1, Mar. 1997, pp. 130-140.
Rekimoto et al., "ToolStone: Effective Use of the Physical Manipulation Vocabularies of Input Devices", In Proc. Of UIST 2000, 2000.
Roos Gina, "Agilent's New Proximity Sensor Beats the Fumble-Fingered Competition Hands Down . . . Literally", eeProductCenter, Available online at: <http://www.eeproductcenter.com/showArticle.jhtml?article_ID_46200544>, Sep. 1, 2004, 3 pages.
Rubine et al., "Programmable Finger-Tracking Instrument Controllers", Computer Music Journal, vol. 14, No. 1, 1990, pp. 26-41.
Rubine Dean, "Combining Gestures and Direct Manipulation", CHI'92, May 3-7, 1992, pp. 659-660.
Rubine Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Rutledge et al., "Force-To-Motion Functions For Pointing", Human-Computer Interaction—Interact, 1990.
Smith et al., "Relating Distortion to Performance in Distortion Oriented Displays", Proceedings of Sixth Australian Conference on Computer-Human Interaction, Nov. 1996, pp. 6-11.
Strietelmeier Julie, "Apple iPod (30GB) Review", The Gadgeteer, Available online at: <http://thegadgeteer.com/review/apple_ipod_30gb_review>, Jun. 6, 2003, 13 pages.
Sun Microsystems,"The Star7 PDA Prototype", Available Online at: <http://www.youtube.com/watch?v=Ahg80BYixLO>, 1992, 7 pages.
Texas Instruments,"TSC2003/I2C Touch Screen Controller", Data Sheet SBAS 162, Oct. 2001, 20 pages.
Universal Remote Control, Inc.,"All Complete Control Remotes Now Use Narrow Band RF", Available online at: <http://www.universalremote.com/corporate/press_release.php?press=13>, 2008.
Universal Remote Control, Inc.,"Operating System with the Aurora MX-950", MX-950 Owners Manual, 2005.
Universal Remote Control, Inc.,"MX-950 (The Aurora)", Available online at: <www.unversalremote.com>, 2005.
Wellner Pierre, "The Digital Desk Calculators: Tangible Manipulation on a Desk Top Display", IN ACM UIST '91 Proceedings, Nov. 11-13, 1991, pp. 27-34.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctro of Philosophy in Electrical Engineering, 1999, 363 pages.
Williams Jim, "Applications for a Switched-Capacitor Instrumentation Building Block", Linear Technology Application Note 3, Jul. 1985, pp. 1-16.
Yamada et al., "A Switched-Capacitor Interface for Capacitive Pressure Sensors", IEEE Transactions on Instrumentation and Measurement, vol. 41, No. 1, Feb. 1992, pp. 81-86.
Yeh et al., "Switched Capacitor Interface Circuit for Capacitive Transducers", IEEE, 1985.
Zhai et al., "Dual Stream Input for Pointing and Scrolling", Proceedings of CHI '97 Extended Abstracts, 1997.
Zimmerman et al., "Applying Electric Field Sensing to Human-Compputer Interfaces", In CHI '85 Proceedings, 1995, pp. 280-287.

* cited by examiner

METHOD AND DEVICE FOR NAVIGATING IN A USER INTERFACE AND APPARATUS COMPRISING SUCH NAVIGATION

CROSS-REFERENCE TO RELATED APPLICATIONS

This application is a continuation of U.S. patent application Ser. No. 16/222,838, filed Dec. 17, 2018, and published on Apr. 25, 2019 as U.S. Publication No. 2019-0121470, which is a continuation of U.S. patent application Ser. No. 14/767,238, filed Aug. 11, 2015, and issued on Dec. 18, 2018 as U.S. Pat. No. 10,156,941, which is a National Phase patent application under 35 U.S.C. § 371 of International Application No. PCT/EP2014/052533, filed Feb. 10, 2014, which claims benefit of French Application No. F-1351275, filed Feb. 14, 2013, the entire disclosures of which are incorporated herein by reference for all purposes.

TECHNICAL FIELD

The present invention relates to a method for navigating, via a command surface, in a display screen and in particular a display screen displaying at least one zone or one symbol. It also relates to a device and an apparatus comprising such navigation.

The field of the invention is more particularly, but non-limitatively, that of contactless human-machine interfaces

BACKGROUND

Touch interfaces, or touch screens, are now widely used for controlling apparatuses as varied as computers, mobile phones, tablets, etc.

Generally, a touch interface comprises a display screen combined with or incorporating a sensor or sensors which make it possible to determine a point or points of contact between the surface of the screen and one or more command objects such as one or more fingers or a stylus. It also comprises a software element making it possible to interpret the user's commands.

Capacitive measurement technologies are suitable for producing this type of interface.

Novel touch interfaces, known as 3D interfaces, incorporate a detection of objects at a distance before they touch the surface of the screen. These touch interfaces also make it possible to activate a command or a function previously associated with a symbol targeted by the command object, when the distance between the command object and the command surface reaches a predetermined value. Such an interface is described in the French patent application filed by the Applicant and published under the number FR 2 971 066 A1.

With this interface, it is thus possible to select, at a distance from the command surface, functions associated beforehand with a pair (displayed symbol; distance between the command object and the command surface). This interface therefore provides a useful possibility for selecting a command through a command surface, which is added to the possibility of selection by contact with a commonly used command surface.

A purpose of the present invention is to propose additional functionalities for navigating in a display screen proposing a better control of a user interface.

Another purpose of the present invention is to propose a method for navigating on a display screen making the selection of a command on a display screen easier and faster.

Another purpose of the present invention is to propose a method for navigating on a display screen making the navigation and the selection on a display screen more ergonomic for a user.

SUMMARY

At least one of these objectives is achieved with a method for navigating in a display screen via a command surface, comprising a step of measuring:
  an item of data, known as position data, relating to a position, on said command surface, targeted by a remote command object positioned facing said command surface, and
  an item of data, known as vertical distance data, relating to the distance between the at least one remote command object and said command surface, in particular in a plane perpendicular to said command surface;
  characterized in that it also comprises a step, known as the control step, carrying out, as a function of said measured vertical distance:
  a movement, and/or
  an adjustment of a parameter relating to a movement;
of at least a part of a zone and/or of a symbol displayed on said display screen and chosen as a function of said targeted position.

Thus the method according to the invention makes it possible to use the distance between a command object and the command surface either to manipulate a zone and/or a symbol displayed on the screen or to adjust a parameter relating to such a manipulation, but without the command object thereby touching the command surface or the user making any selection.

Such a utilization, according to the invention, of the distance between a command object and the command surface makes it possible to make the navigation more direct and more rapid, simpler and more ergonomic compared with the current interfaces.

For example, in order to reposition an icon on a display screen with the current interfaces, it is necessary first of all to activate a movement function beforehand, in particular, with the interface used by the iPhone®, by prolonged contact with a command surface. According to another example, in order to magnify an icon (which amounts to moving only a part of the icon or moving a display zone containing the icon) with the current interfaces, it is necessary to use two command objects, which are generally two fingers, and to move them laterally with respect to each other. The present invention makes it possible to dispense with a prior step of activating a function or a use of two command objects, which makes the navigation more direct, more rapid, simpler and more ergonomic for the user.

Moreover, no interface known in the prior art makes it possible to adjust a movement parameter of an object as a function of the distance between a command object and a command surface. Thus, the invention brings a novel functionality to the current interfaces.

According to the invention, each symbol can be a symbol associated with/dedicated to a command.

Each symbol can comprise one or more other symbols, and in particular can be a set of symbols, such as a folder of symbols.

To avoid overcomplicating the description, in the rest of the application the expression "element" denotes "a zone and/or a symbol".

In a particular and in no way limitative version of the invention, by "movement" is meant a movement of the element displayed on the display screen, without such movement adding a new dimension to be displayed for said element.

Still in a particular and in no way limitative version, the movement and/or the adjustment carried out by the control step takes into account a unique pointing position of the command object and involves an element chosen with respect to this unique pointing position.

According to the invention, a movement of an element can involve only one part of the element, such that said movement consists of modifying the displayed size of said element on the display screen. In other words, in this case, the movement is a zoom of the element.

In particular, the modification of the size or the zoom of the element can be carried out such that the size of the element increases when the vertical distance decreases.

The modification of the size of the element can be carried out such that a part of the element is no longer displayed on the screen.

In a first embodiment, the control step can also comprise modifying the size of at least one element, other than the chosen element, displayed on the display screen, such that the total size of the set of the elements remains constant.

Such a modification can optionally be accompanied by a repositioning of at least one element other than the chosen element.

The modification of the size of at least one other element can be an increase in its size or a decrease in its size. In a particular embodiment example, the elements next to the chosen element can undergo a size modification in the same sense and the rest of the elements can undergo a size modification in the opposite sense with respect to the sense in which the modification carried out on the chosen element.

In particular, the control step can comprise a modification of the size of all the other elements displayed on the display screen, optionally accompanied by a repositioning of at least one of them, such that all the elements remain displayed on the display screen.

Moreover, the control step can comprise a modification of the size of a set comprising the chosen element and at least one other element, such that the size of said at least one other element remains constant during the modification of the size of the chosen element.

Such a modification can optionally be accompanied by a repositioning of at least one element other than the chosen element.

The modification of the size of the set can be an increase of its size or a decrease of its size, and in particular corresponds to a modification in the same sense as the sense in which the modification is carried out on the size of the chosen element.

The set can be the one comprising all the elements represented on the display screen. In this case, as a function of the measured vertical distance, some of the elements initially displayed on the display screen can disappear from or reappear on the display screen during the modification of the size of the chosen element, which implies a repositioning of these elements.

Advantageously, when an element the size of which is modified comprises at least one zone, known as a sub-zone, and/or at least one symbol, known as a sub-symbol, the control step can also comprise a modification of the size of said at least one sub-zone and/or sub-symbol.

In this case, the modification of the size of the at least one sub-zone and/or sub-symbol is carried out in the same sense as the modification of the size of the element which comprises it.

According to the invention, the movement can involve all the points of the chosen at least one zone and/or symbol such that the set of the at least one zone and/or symbol is moved laterally on the display screen in a predetermined direction.

In particular, the repositioning can be carried out such that the zone or the symbol moves away from the position targeted by the command object when the vertical distance decreases.

Thus, it is possible to have a sensitivity for the movement of an object on the display screen that is variable as a function of the distance between the command object and the command surface.

For example, an amount/speed/acceleration of rotation or repositioning of a symbol can be adjusted as a function of the distance between the command object and the command surface. Such a symbol can, non-limitatively, be a linear or rotary cursor for selecting the value of a parameter such as volume, display contrast, date, time, etc.

According to the invention, the parameter relating to the movement adjusted as a function of the vertical distance can comprise at least one of the following parameters:

- an amount of lateral movement or rotation, on the display screen, of/in the at least one zone and/or symbol, for a given distance of lateral movement or rotation of the command object in a plane parallel to the command surface; and
- a speed of lateral movement or rotation, on the display screen, of/in the at least one zone and/or symbol, for a given speed of lateral movement or speed of rotation of the command object in a plane parallel to the command surface; and/or
- an acceleration of lateral movement or rotation, on the display screen, of/in the at least one zone and/or symbol, for a given acceleration of lateral movement or acceleration of rotation of the command object in a plane parallel to the command surface.

In other words, for two different vertical distances, the amount/speed/acceleration of lateral movement or rotation of/in the chosen element can be different for one and the same increment size of lateral movement or rotation of the command object.

In particular, the adjustment can be carried out such that, for one and the same distance of lateral movement (or one and the same rotation) of the command object, the amount/speed/acceleration of lateral movement (or rotation) increases when the vertical distance decreases.

The lateral movement or rotation, the amount/speed/acceleration of which is adjusted as a function of the vertical distance, can be a movement or a rotation in the same sense as or in the opposite sense to the lateral movement of the command object.

Advantageously, the adjustment, as a function of the measured vertical distance, of the parameter relating to the movement on the display screen can be carried out via a multiplier factor, also called a "lever arm", which is adjusted as a function of the measured vertical distance. The use of this multiplier factor can be such that the value of the parameter relating to the movement on the display screen is obtained by multiplying the measured value of the parameter for the command object by the adjusted value of the multiplier factor as a function of the measured vertical distance, namely:

(Value of parameter of movement on the screen)= (measured Value of parameter for the command object)×(Value of multiplier factor)$_{adjusted\ as\ a\ function\ of\ the\ vertical\ distance}$ In the case of a particular embodiment example, the chosen symbol can be a list comprising at least two symbols, and the adjusted parameter comprises the speed and/or the acceleration and/or a lateral distance of scrolling/unrolling of said list.

In particular, the adjustment can be carried out such that the value of the adjusted parameter increases when the vertical distance decreases.

According to an advantageous feature of the method according to the invention, the control step can be initiated when the vertical distance is less than or equal to a predetermined value, known as the start value.

The method according to the invention can also comprise activation of the display produced by the display screen when the vertical distance reaches the start value or a predetermined value, known as the display value, greater than said start value. In this case, one or more repetitions of the measurement and control steps can be carried out on a displayed element following said activation.

The control step can be frozen/stopped when the vertical distance is less than or equal to a predetermined value, known as the freeze value. Thus, the display is frozen to allow an easier selection for the user.

The method according to the invention can also comprise a step of selecting an element by bringing the command object into contact with the command surface, said selection initiating the execution of a command associated with said element.

Alternatively, the selection can be carried out when the vertical distance is less than or equal to a predetermined value, known as the selection value, which can be equal to the stop value or less than the stop value.

A selection step can be carried out after a control step, or one or more repetitions of the measurement and control steps. In this case the selection is carried out on a previously moved element or an element for which a movement parameter was adjusted during the control step.

A selection step can alternatively or additionally be carried out before a control step. In this case, one or more repetitions of the measurement and control steps can be carried out on a displayed element following said selection.

The method according to the invention can advantageously comprise a continuous repetition of the measurement and control steps.

In other words, the measurement and control steps are carried out continuously at a given frequency, for example greater than or equal to the display frequency of the display screen.

Alternatively, the measurement step can be repeated continuously at a given frequency, for example greater than or equal to the display frequency, and the control step can be repeated discretely, i.e. when the variation of the vertical distance measured during the measurement step is greater than or equal to a predetermined value. Such discrete repetition of the control step makes it possible to reduce the computation resources and the energy consumed.

The measurement of at least one item of distance data, and/or of at least one item of position data, can comprise at least:
  one measurement of capacitive interactions between the command object and at least one sensor, and
  one measurement of variations of light intensity due to the presence of the command object.

According to another aspect of the invention a device is proposed for navigating, via a command surface, in a display screen, comprising at least one measurement means arranged to determine:
  an item of data, known as position data, relating to a position, on said command surface, targeted by a remote command object positioned facing said command surface, and
  an item of data, known as vertical distance data, relating to the distance between the at least one remote command object and said command surface, in particular in a plane perpendicular to said command surface;
said device also comprising at least one means, known as the control means, configured to adjust, as a function of said item of distance data,
  a movement, and/or
  an adjustment of a parameter relating to the movement;
of at least a part of a zone and/or of a symbol displayed on said display screen and chosen as a function of said targeted position.

The control means can be an electronic or computer calculation module, constituted by an algorithm or a computer program or also a series of instructions, and executed by a processor, an FPGA or more generally by an integrated circuit.

The measurement means can comprise at least one capacitive sensor, and/or at least one optical sensor.

Advantageously, the measurement means can comprise a set of capacitive sensors combined with at least one optical sensor, of the camera type. Such a combination makes it possible to better detect and measure the position of the command object because the optical sensor is particularly effective when the command object is far away from the command surface, i.e. at a distance greater than 3 to 10 cm depending on the size of the command object, and the capacitive sensors are particularly effective when the command object is close to the command surface, i.e. at a distance of less than 3 to 10 cm depending on the size of the command object. Thus, a combination of these two types of sensors makes it possible to better manage the detection and the measurement of the distance between the command object and the command surface whatever the vertical distance.

The device according to the invention can also comprise a command surface.

Such a command surface can be transparent.

Such a touch surface can be incorporated in or arranged under/on/in a display screen, known as a touch screen.

According to a particular embodiment example, such a touch surface can be a touchpad or a graphics tablet.

According to yet another aspect of the invention an apparatus is proposed which comprises a display screen for displaying a plurality of symbols, and:
  a device according to the invention, or
  means arranged to carry out all the steps of the method according to the invention; for navigating in said display screen.

According to a preferred embodiment, the display screen can be arranged under a transparent command surface comprising/incorporating at least one measurement means.

Such an apparatus can be a display screen, in particular a touch screen display, a computer, a telephone, a smartphone, a tablet, a terminal, or any other apparatus comprising means for interacting with a user using a pointing or command or also selection object.

BRIEF DESCRIPTION OF THE DRAWINGS

Other advantages and characteristics will become apparent on examination of the detailed description of examples that are in no way limitative and the attached drawings in which.

DETAILED DESCRIPTION

It is well understood that the embodiments that will be described hereinafter are in no way limitative. Variants of the invention can in particular be envisaged comprising only a selection of the features described below in isolation from the other described features, if this selection of features is sufficient to confer a technical advantage or to differentiate the invention with respect to the prior art. This selection comprises at least one preferably functional feature without structural details, or with only a part of the structural details if this part alone is sufficient to confer a technical advantage or to differentiate the invention with respect to the prior art.

In particular, all the described variants and embodiments can be combined if there is no objection to this combination from a technical point of view.

In the figures, the elements common to several figures retain the same references.

An embodiment of the invention will be described which utilizes capacitive sensors. Of course, this embodiment is an example, in no way limitative, for implementing the invention suitable for producing a human-machine interface (HMI) for a host system such as a mobile phone, a smartphone, a tablet or a computer.

Figure 1:
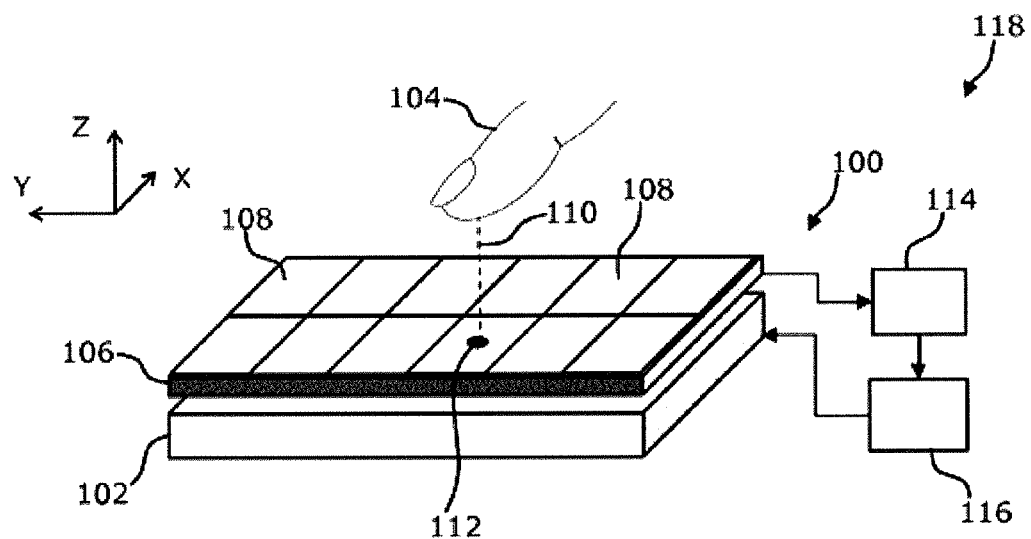
FIG. 1 is a diagrammatic representation of an example of the device according to the invention.

FIG. 1 is a diagrammatic representation of an example of the device according to the invention for navigating in a display screen.

The device 100 represented in FIG. 1 makes it possible to navigate in a display screen 102 with a command object 104.

The display screen 102 can be based, for example, on liquid crystal technology, LCD, TFT (thin-film transistor), or OLED (organic light-emitting diode).

The command object 104, in the example represented in FIG. 1, is a finger of a user. The command object can alternatively be a hand of a user or a stylus.

The device 100 comprises a command surface 106 that is substantially transparent and flat. The command surface 106 is arranged on the display screen 102 and allows visual access to the display screen 102 by being transparent. In the example represented in FIG. 1, the display surface is a surface that is independent of the display screen 102. Alternatively, the command surface 106 can be the display screen 102 or a surface of the display screen 102.

The device 100 also comprises capacitive sensors 108, likewise substantially transparent and capable of detecting the presence of the command object 104. The capacitive sensors 108 are arranged on the command surface 106 in the example represented in FIG. 1. Alternatively, the capacitive sensors can be incorporated in the command surface 106 or directly in the display screen 102.

The sensors 108 can comprise capacitive electrodes based on ITO (indium tin oxide). Depending on the applications, they can vary in terms of number and arrangement, FIG. 1 being merely for the purposes of illustration.

The capacitive sensors 108 provide on the one hand items of information relating to the distance along the Z-axis between the command object 104 and the command surface 106, indicated by the dotted line 110, and on the other hand items of information relating to the position in the plane (X, Y) of a projection along the Z-axis of the command object 104 onto the command surface 106, indicated by the dot 112. The capacitive sensors 108 are also capable of detecting a contact between the command object 104 and the command surface 106.

The device 100 also comprises an electronic measurement module 114, connected to the capacitive sensors 108, which makes it possible to determine the distance 110 and the position 112 as a function of the signals provided by the capacitive sensors 108. The items of data relating to the distance 110 and to the position 112 comprise equivalent distance 110 and position 112 measurements. These measurements, not necessarily expressed in units of length, are translations of measurements of capacitances or variations of capacitances. In particular, physical characteristics of the command object 104 can affect the measured capacitances and therefore their translation in terms of equivalent distance and/or positions.

The items of data relating to the distance 110 and to the position 112 can also comprise trajectories, defined as time sequences of distances 110 and/or positions 112, and derived values such as speeds and accelerations.

In a preferred embodiment, the sensors 108 and the electronic measurement module 114 are produced according to the methods described in the document FR 2 971 066 A1.

The device 100 according to the invention can also comprise a control module 116, present for example in the form of a microprocessor or CPU (for "Central Processing Unit") associated with components such as random-access memories (RAM), mass storage means (hard disk, flash memory, etc.), and making it possible to execute one (or a plurality of) computer or software program(s). This control module 116 is connected to the measurement module 114. The control module 116 is configured:

as a function of the position 112: to choose a zone or a symbol targeted by the command object 104 on the display screen;

as a function of the distance 110: to move the chosen zone or symbol or to adjust a parameter relating to the movement of the chosen zone or symbol; and optionally to move at least one other element displayed by the display screen, in particular the rest of the elements displayed on the display screen.

The control module 116 can be incorporated in a processor of an apparatus producing, among other things, a display on the display screen 102, i.e. a processor generating the image or the images to be displayed. Such an apparatus can be a computer, a tablet, a smartphone, a telephone, a PDA, etc.

The control module 116 can alternatively be present in the form of a processor in its own right working with the processor of such an apparatus.

The device 100 with the display screen 102 constitutes a non-limitative example of an apparatus 118 according to the invention which can be a tablet or a smartphone with touch command.

Figure 2:
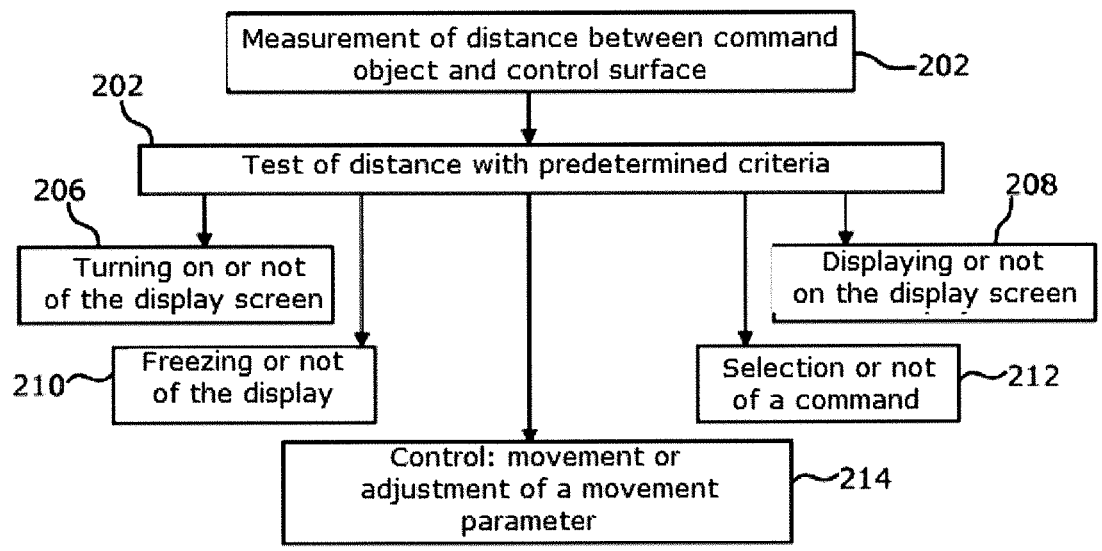
FIG. 2 is a diagrammatic representation of an example of the method according to the invention.

FIG. 2 is a diagrammatic representation of an example of a method according to the invention for navigating in a display screen.

The method 200 comprises a step 202 of measuring the vertical distance between the command surface and the command object, for example the distance 110, and optionally the position targeted by the command object, for example the position 112.

During a step 204, the measured distance 110 is compared with predetermined threshold values.

Steps 202 and 204 are carried out either continuously at a predetermined frequency or at a frequency modulated as a function of the measured distance.

During step 204, the following comparisons are carried out.

The measured distance 110 is compared with a value, known as the turn-on value, to decide whether or not to turn on the display screen. As a function of this comparison, if required, a step 206 carries out the turning on or turning off of the display screen.

The measured distance 110 is compared with a value, known as the display value, to decide whether or not to display at least one symbol on the display screen. As a function of this comparison, if required, a step 208 does or does not produce the display of at least one element on the display screen.

The measured distance 110 is compared with a value, known as the freeze value, to decide if the produced display has to be frozen or locked with a view for example to carrying out a selection of whether or not to display at least one symbol on the display screen. As a function of this comparison, if required, a step 210 freezes, or does not freeze, the display produced on the display screen as it is.

The measured distance 110 is compared with a value, known as the selection value, to decide if the command object carries out, or does not carry out, a selection of a command associated with a symbol. As a function of this comparison, if required, a step 212 activates the carrying out of the selected command. The selection value can be a zero value. In this case, the selection is carried out by bringing the command object into contact with the command surface.

Finally, the measured distance 110 is tested to determine if it is comprised between a value, known as the start value, and the stop value in order to determine if a control step has to be carried out. If the measured distance is comprised between these two values, then a control step 212 is carried out in order to move an element displayed on the display screen or to adjust a parameter relating to the movement of an element displayed on the screen, such an element being chosen as a function of the position targeted by the command object.

When, during step 204, several abovementioned criteria are satisfied, i.e. when the measured distance satisfies several of the abovementioned threshold values, then several of the steps 206-214 can be carried out in turn or at the same time.

Non-limitative examples will now be described of movement or adjustment of a parameter relating to the movement of a displayed element as a function of the vertical distance according to the invention. In the following examples, it is understood, to simplify the description, that the command surface corresponds to the surface of the display screen.

Figure 3:
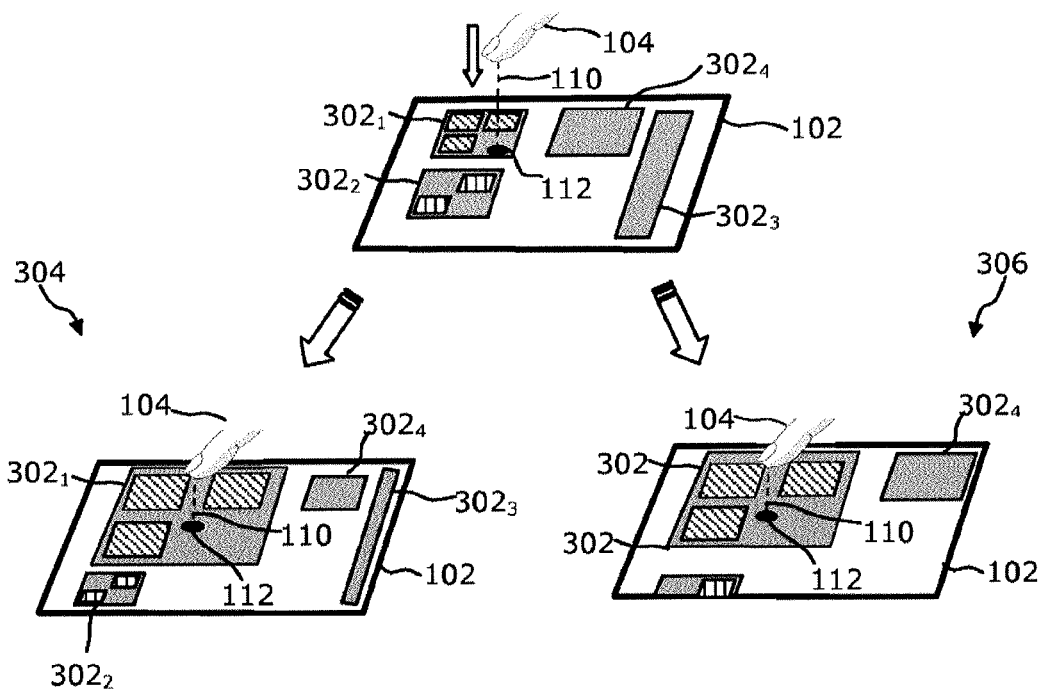
FIGS. 3-6 are diagrammatic representations of four non-limitative examples of navigation in a display screen according to the invention.

FIG. 3 is a diagrammatic representation of a first example of movement of an element displayed on the display screen as a function of the vertical distance according to the invention.

The example represented in FIG. 3 corresponds more particularly to the modification of the size of a symbol displayed on the display screen, for example the display screen 102 of FIG. 1, as a function of the vertical distance 110.

The display screen displays four symbols $302_1$-$302_4$. Each symbol $302_1$ comprises one or more symbols, known as sub-symbols.

As a function of the position 110 of the command object 104, the symbol $302_1$ or a zone around the position 110 is chosen.

When the command object 104 moves closer to the display screen, the size of the symbol $302_1$ or the zone around the position 110 is magnified or zoomed, as represented in cases 304 and 306, which correspond to two ways of carrying out such a magnification.

In case 304, when the symbol $302_1$ or the zone around the position 110 is magnified, the size of the other displayed symbols or zones is decreased such that all the symbols 302 remain displayed in the display screen.

In case 306, when the symbol $302_1$ or the zone around the position 110 is magnified, the size of the other displayed symbols or zones is kept constant such that the symbol $302_2$ is partially displayed on the display screen and the symbol $302_3$ is no longer displayed in the display screen.

In the two cases 304 and 306, during the magnification of the symbol $302_1$, one of the other displayed symbols or zones can be repositioned entirely.

Moreover, in the example represented in FIG. 3, when the symbol $302_1$ is magnified then the sub-symbols that the symbol $302_1$ contains are also magnified. This processing is optional and it is possible for the sub-symbols not to magnified.

Of course, when the finger moves away from the display screen, the size of the symbol or symbols or of the zone previously magnified is decreased in a bijective manner and the other displayed elements are magnified and repositioned likewise in a bijective manner.

When the command object changes position in the plane of the display screen, then the processing which has just been described is applied, continuously, to another symbol or to another zone relative to each new position targeted by the command object.

Figure 4:
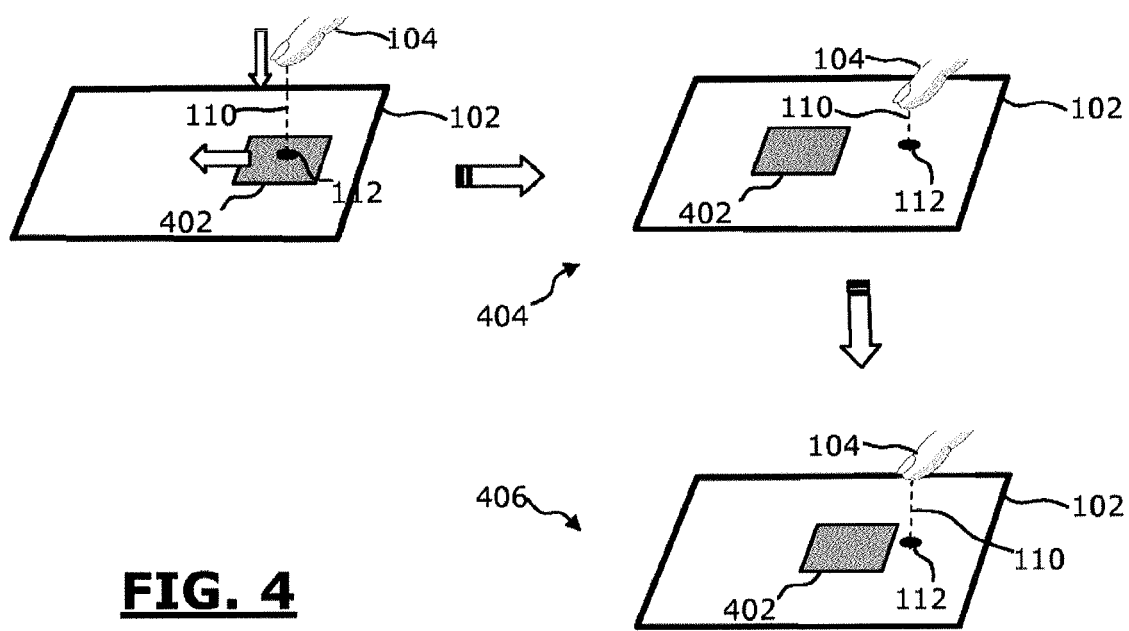

FIG. 4 is a diagrammatic representation of a second example of movement of an element displayed on the display screen as a function of the vertical distance according to the invention.

The example represented in FIG. 4 corresponds more particularly to the repositioning of a symbol 402 displayed on the display screen, for example the display screen 102 of FIG. 1, as a function of the vertical distance 110.

In the configuration 404, the position 112 of the command object 104 is used to choose the symbol 402.

When the command object 104 moves closer to the screen 102, i.e. when the distance 110 decreases, the symbol 402 is moved away from the initial position 112 in a predetermined direction and sense, as represented in the configuration 404.

When, afterwards, the command object 104 moves away from the screen 102, i.e. when the distance 110 increases, the symbol 402 moves closer to the initial position 112, being moved in the opposite direction and sense, as represented in the configuration 406.

Figure 5:
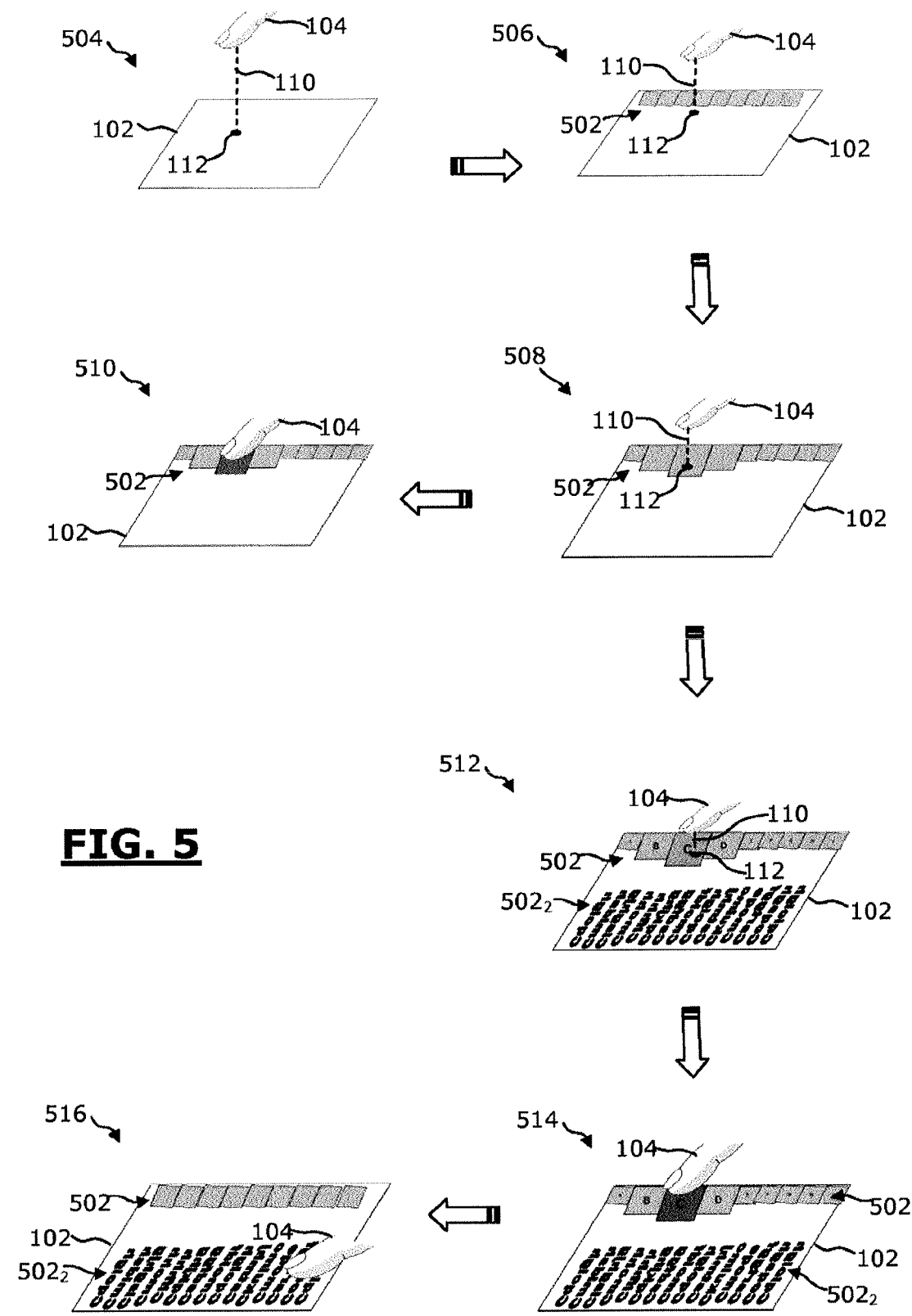

FIG. 5 is a diagrammatic representation of a third example of movement of an element displayed on the display screen as a function of the vertical distance according to the invention.

The example represented in FIG. 5 corresponds more particularly to the manipulation of a list 502 of symbols, displayed edge of display screen, for example the display screen 102 of FIG. 1, as a function of the vertical distance 110.

In the configuration 504, the command object 104 moves closer to the surface of the screen 102.

As represented on the configuration 506, when the distance 110 between the command object 104 and the screen 102 is less than or equal to a predetermined distance, known as the display distance, the list 502 of symbols is displayed on the screen 102.

When the command object 104 continues to move closer to the display screen 102, a part of the list 502 chosen as a function of the position 112 targeted by the command object 104 is magnified, as represented in the configuration 508. More particularly, the size of symbols next to the position 112 targeted by the command object 104 is increased and the size of the symbols furthest away from the position 112 is decreased. Some of the symbols of the list 502 are also repositioned so as to keep the whole of the list displayed on the display screen. The modification of the size of the different symbols is a function of the distance 110 between the command object and the surface of the display screen 102. In other words, the size of the different symbols of the list of symbols 502 is adjusted as a function of the distance 110.

In a first variant, represented in the configuration 510, when, afterwards, the command object 104 touches the screen or the distance 110 between the command object 104 and the screen 102 is less than or equal to a predetermined distance, known as the selection distance, a symbol is selected from the list 502 of symbols.

In a second variant, represented in the configuration 512, the command object 104 continues to move closer to the screen 102. As a function of the targeted position 112, and when the distance 110 exceeds a predetermined value, one of the symbols of the list 502 of symbols is chosen, namely the symbol "C". The chosen symbol can be indicated by a change in colour or by any other means. The choice of a symbol from the list 502 of the symbols activates the display of another list $502_2$ corresponding to the content of the symbol, such as for example a list of names starting with the letter C. This other list $502_2$ can be displayed at another edge of the display screen 102, for example the opposite edge. The choice of a symbol results in the display produced on the screen 102 being frozen.

The configuration 512 is then followed by a configuration 514 representing the selection of the previously chosen symbol, as described above with reference to the configuration 510.

After the selection of a symbol, for example by bringing the command object 104 into contact with the screen 102, the user has the possibility of navigating in the second list $502_2$, as represented in the configuration 516.

Figure 6:
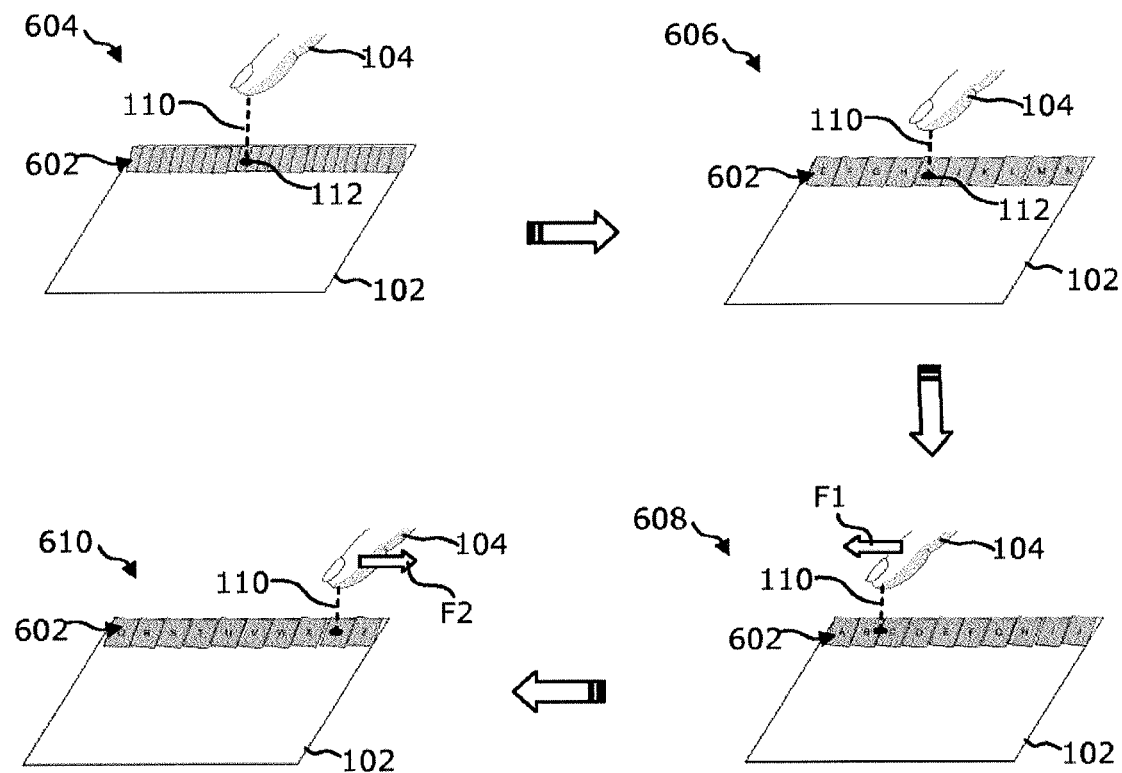

FIG. 6 is a diagrammatic representation of a fourth example of movement of an element displayed on the display screen as a function of the vertical distance according to the invention.

The example represented in FIG. 6 corresponds more particularly to the manipulation of a list 602 of symbols, displayed on an edge of a display screen, for example the display screen 102 of FIG. 1, as a function of the vertical distance 110. As represented in the configuration 604, the list 602 comprises a large number of small symbols which are difficult to select with the command object 104.

When the command object 104 moves closer to the screen, i.e. the distance 110 decreases, the list 602 is zoomed around the position 112 of the command object 104 such that only a part of the list is displayed on the screen 102. The result obtained is shown in the configuration 606. The zoom carried out is a function of the distance 110 between the command object 104 and the surface of the screen 102.

When the command object 104 is moved in a first sense indicated by the arrow F1 represented in the configuration 608, the list always scrolls in the same sense as the command object 104, while still remaining zoomed.

When the command object 104 is moved in an opposite sense indicated by the arrow F2 represented in the configuration 610, the list scrolls in the same sense as the command object 104, while still remaining zoomed.

The amount and/or speed of scrolling of the list 602 on the display screen, for a distance of lateral movement of the command object, is adjusted as a function of the distance 110 between the command object 104 and the screen 102. More precisely, the smaller the distance 110, the higher the speed/amount of scrolling of the list 602 on the display screen, and vice versa.

In another embodiment, which is not represented, the invention makes it possible to adjust the amount/speed of scrolling of a list of symbols or the rotation of a symbol or also the repositioning of a symbol but without the size of the symbol or of the list being modified as a function of the distance between a command object and the command surface. In this case, the distance between the command object and the command surface is used to adjust the amount/speed concerned and the list or the symbol is manipulated by the lateral movement of the command object in the plane of the command surface.

For example, according to the invention, it is possible to adjust the amount of scrolling on the screen of a list of symbols as a function of the distance between the command object or the command surface, but without thereby modifying the size of this element. In this case, several movement amounts chosen/adjusted as a function of the distance between the command object and the command surface correspond to a given increment size of movement of the command object in the plane of the command surface.

This example can be applied to a speed of rotation or to a repositioning speed of a symbol, which can for example be a linear or rotary cursor.

Of course, the invention is not limited to the examples which have just been described and numerous adjustments can be made to these examples without exceeding the scope of the invention.

The invention claimed is:

1. A method comprising:
   displaying a first user interface including a first user interface element and a second user interface element that is different from the first user interface element;
   while displaying the first user interface, detecting a first input that includes movement of a hovering object toward a portion of the first user interface;
   in response to detecting the first input, changing a size of a plurality of user interface elements based on an amount of movement of the hovering object toward the portion of the first user interface during the first input, including:
      increasing a size of the first user interface element by a first amount, wherein the first amount is a function of at least a distance of the hovering object from the portion of the first user interface; and
      increasing a size of the second user interface element by a second amount different than the first amount, wherein the second amount is a function of at least the distance of the hovering object from the portion of the first user interface;
   after detecting the first input, detecting a second input that includes further movement of the hovering object toward the portion of the first user interface; and
   in response to detecting the second input, changing the size of the plurality of user interface elements based on an amount of movement of the hovering object toward the portion of the first user interface during the second input, including:

increasing the size of the first user interface element by a third amount, wherein the third amount is a function of at least the distance of the hovering object from the portion of the first user interface; and increasing the size of the second user interface element by a fourth amount, wherein the fourth amount is a function of at least the distance of the hovering object from the portion of the first user interface.

2. The method of claim 1, wherein the first user interface element and the second user interface element are independently selectable to perform different commands.

3. The method of claim 1, wherein the first user interface further includes a third user interface element and a fourth user interface element that is different from the third user interface element; and wherein changing the size of the plurality of user interface elements further includes:

decreasing a size of the third user interface element by a fifth amount; and decreasing a size of the fourth user interface element by a sixth amount different than the fifth amount, wherein the fifth amount is a function of a distance of the third user interface element from the portion of the first user interface and the sixth amount is a function of a distance of the fourth user interface element from the portion of the first user interface.

4. The method of claim 1, further comprising:
displaying the first user interface in response to detecting the hovering object within a threshold distance from the portion of the first user interface.

5. The method of claim 1, further comprising:
repositioning the plurality of user interface elements in accordance with changing the size of the plurality of user interface elements to keep the first user interface displayed in the first user interface.

6. The method of claim 5, further comprising:
stopping changing the size of the plurality of user interface elements and repositioning the plurality of user interface elements in response to detecting the hovering object within a threshold distance from the portion of the first user interface.

7. The method of claim 1, further comprising:
detecting a third input that includes the hovering object over the portion of the first user interface within a first selection threshold distance from the portion of the first user interface; and in response to detecting the third input:
selecting a user interface element corresponding to the portion of the first user interface; and
displaying a second user interface corresponding to the first user interface element.

8. The method of claim 7, wherein the first user interface element corresponds to a character and the second user interface includes a plurality of words beginning with the character.

9. The method of claim 7, further comprising:
detecting a fourth input that includes movement of the hovering object over the portion of the first user interface to a portion of the second user interface; and in response to detecting the fourth input:
maintaining display of the first user interface and the second user interface.

10. The method of claim 9, further comprising:
detecting a fifth input that includes the hovering object over the portion of the second user interface within a second selection threshold distance from the portion of the second user interface; and in response to detecting the fifth input:
selecting a user interface element corresponding to the portion of the second user interface, the selection initiating execution of a command associated with the selected user interface element in the second user interface.

11. An electronic device, comprising:
one or more processors;
memory, wherein the one or more processors are configured to execute instructions stored in the memory, and wherein the instructions, when executed, are configured to cause the electronic device to perform operations comprising:

displaying a first user interface including a first user interface element and a second user interface element that is different from the first user interface element;

while displaying the first user interface, detecting a first input that includes movement of a hovering object toward a portion of the first user interface;

in response to detecting the first input, changing a size of a plurality of user interface elements based on an amount of movement of the hovering object toward the portion of the first user interface during the first input, including:

increasing a size of the first user interface element by a first amount, wherein the first amount is a function of at least a distance of the hovering object from the portion of the first user interface; and increasing a size of the second user interface element by a second amount different than the first amount, wherein the second amount is a function of at least the distance of the hovering object from the portion of the first user interface;

after detecting the first input, detecting a second input that includes further movement of the hovering object toward the portion of the first user interface; and in response to detecting the second input, changing the size of the plurality of user interface elements based on an amount of movement of the hovering object toward the portion of the first user interface during the second input, including:

increasing the size of the first user interface element by a third amount, wherein the third amount is a function of at least the distance of the hovering object from the portion of the first user interface; and increasing the size of the second user interface element by a fourth amount, wherein the fourth amount is a function of at least the distance of the hovering object from the portion of the first user interface.

12. The electronic device of claim 11, wherein the first user interface element and the second user interface element are independently selectable to perform different commands.

13. The electronic device of claim 11, wherein the first user interface further includes a third user interface element and a fourth user interface element that is different from the third user interface element; and wherein changing the size of the plurality of user interface elements further includes:

decreasing a size of the third user interface element by a fifth amount; and decreasing a size of the fourth user interface element by a sixth amount different than the fifth amount, wherein the fifth amount is a function of a distance of the third user interface element from the portion of the first user interface and the sixth amount is a function of a distance of the fourth user interface element from the portion of the first user interface.

14. The electronic device of claim 11, wherein the operations further comprise:
displaying the first user interface in response to detecting the hovering object within a threshold distance from the portion of the first user interface.

15. The electronic device of claim 11, wherein the operations further comprise:
repositioning the plurality of user interface elements in accordance with changing the size of the plurality of user interface elements to keep the first user interface displayed in the first user interface.

16. The electronic device of claim 15, wherein the operations further comprise:
stopping changing the size of the plurality of user interface elements and repositioning the plurality of user interface elements in response to detecting the hovering object within a threshold distance from the portion of the first user interface.

17. The electronic device of claim 11, wherein the operations further comprise:
detecting a third input that includes the hovering object over the portion of the first user interface within a first selection threshold distance from the portion of the first user interface; and
in response to detecting the third input:
selecting a user interface element corresponding to the portion of the first user interface; and
displaying a second user interface corresponding to the first user interface element.

18. The electronic device of claim 17, wherein the first user interface element corresponds to a character and the second user interface includes a plurality of words beginning with the character.

19. The electronic device of claim 17, wherein the operations further comprise:
detecting a fourth input that includes movement of the hovering object over the portion of the first user interface to a portion of the second user interface; and
in response to detecting the fourth input:
maintaining display of the first user interface and the second user interface.

20. The electronic device of claim 19, wherein the operations further comprise:
detecting a fifth input that includes the hovering object over the portion of the second user interface within a second selection threshold distance from the portion of the second user interface; and
in response to detecting the fifth input:
selecting a user interface element corresponding to the portion of the second user interface, the selection initiating execution of a command associated with the selected user interface element in the second user interface.

21. A non-transitory computer readable storage medium storing instructions, which when executed by one or more processors of an electronic device, cause the electronic device to perform operations comprising:
displaying a first user interface including a first user interface element and a second user interface element that is different from the first user interface element;
while displaying the first user interface, detecting a first input that includes movement of a hovering object toward a portion of the first user interface;
in response to detecting the first input, changing a size of a plurality of user interface elements based on an amount of movement of the hovering object toward the portion of the first user interface during the first input, including:
increasing a size of the first user interface element by a first amount, wherein the first amount is a function of at least a distance of the hovering object from the portion of the first user interface; and
increasing a size of the second user interface element by a second amount different than the first amount, wherein the second amount is a function of at least the distance of the hovering object from the portion of the first user interface;
after detecting the first input, detecting a second input that includes further movement of the hovering object toward the portion of the first user interface; and
in response to detecting the second input, changing the size of the plurality of user interface elements based on an amount of movement of the hovering object toward the portion of the first user interface during the second input, including:
increasing the size of the first user interface element by a third amount, wherein the third amount is a function of at least the distance of the hovering object from the portion of the first user interface; and
increasing the size of the second user interface element by a fourth amount, wherein the fourth amount is a function of at least the distance of the hovering object from the portion of the first user interface.

22. The non-transitory computer readable storage medium of claim 21, wherein the first user interface element and the second user interface element are independently selectable to perform different commands.

23. The non-transitory computer readable storage medium of claim 21, wherein the first user interface further includes a third user interface element and a fourth user interface element that is different from the third user interface element; and
wherein changing the size of the plurality of user interface elements further includes:
decreasing a size of the third user interface element by a fifth amount; and
decreasing a size of the fourth user interface element by a sixth amount different than the fifth amount,
wherein the fifth amount is a function of a distance of the third user interface element from the portion of the first user interface and the sixth amount is a function of a distance of the fourth user interface element from the portion of the first user interface.

24. The non-transitory computer readable storage medium of claim 21, wherein the operations further comprise:
displaying the first user interface in response to detecting the hovering object within a threshold distance from the portion of the first user interface.

25. The non-transitory computer readable storage medium of claim 21, wherein the operations further comprise:
repositioning the plurality of user interface elements in accordance with changing the size of the plurality of user interface elements to keep the first user interface displayed in the first user interface.

26. The non-transitory computer readable storage medium of claim 25, wherein the operations further comprise:

stopping changing the size of the plurality of user interface elements and repositioning the plurality of user interface elements in response to detecting the hovering object within a threshold distance from the portion of the first user interface.

27. The non-transitory computer readable storage medium of claim 21, wherein the operations further comprise:
   detecting a third input that includes the hovering object over the portion of the first user interface within a first selection threshold distance from the portion of the first user interface; and
   in response to detecting the third input:
      selecting a user interface element corresponding to the portion of the first user interface; and
      displaying a second user interface corresponding to the first user interface element.

28. The non-transitory computer readable storage medium of claim 27, wherein the first user interface element corresponds to a character and the second user interface includes a plurality of words beginning with the character.

29. The non-transitory computer readable storage medium of claim 27, wherein the operations further comprise:
   detecting a fourth input that includes movement of the hovering object over the portion of the first user interface to a portion of the second user interface; and
   in response to detecting the fourth input:
      maintaining display of the first user interface and the second user interface.

30. The non-transitory computer readable storage medium of claim 29, wherein the operations further comprise:
   detecting a fifth input that includes the hovering object over the portion of the second user interface within a second selection threshold distance from the portion of the second user interface; and
   in response to detecting the fifth input:
      selecting a user interface element corresponding to the portion of the second user interface, the selection initiating execution of a command associated with the selected user interface element in the second user interface.

* * * * *